United States Patent Office 3,528,495
Patented Sept. 15, 1970

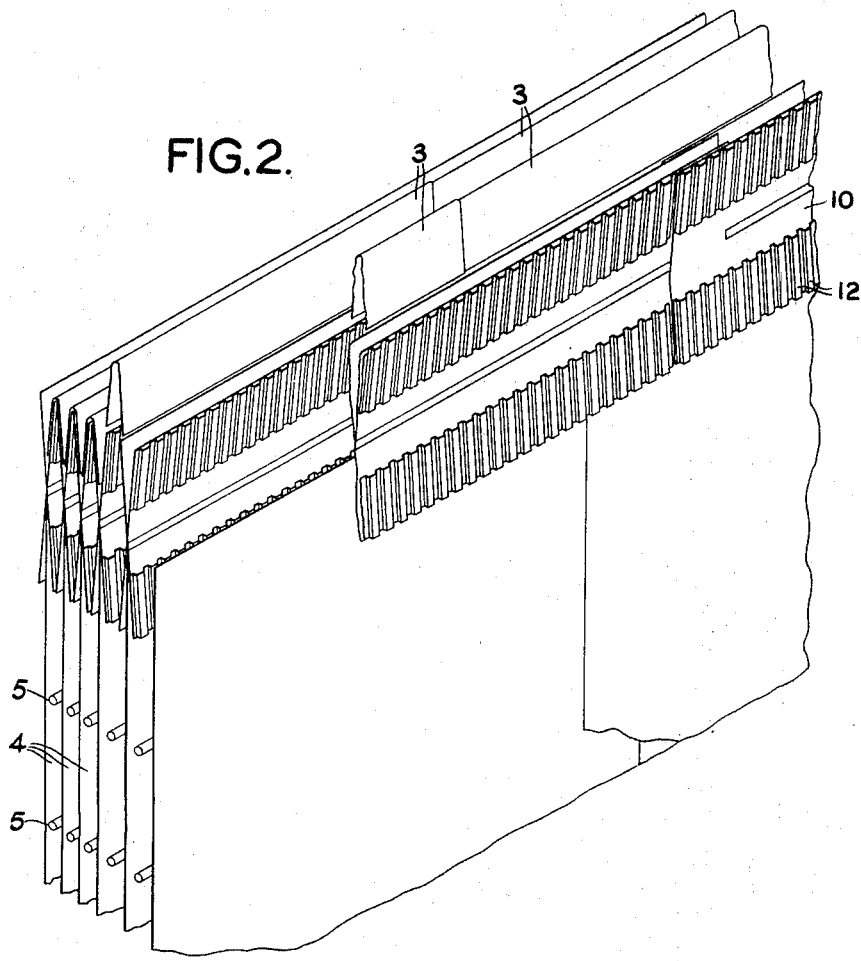

3,528,495
THERMAL INSULATION
Edward Armstrong, Stockton-on-Tees, and Peter J. McCarthy, Pemberton, England, assignors to Darchem Engineering Limited, Stockton-on-Tees, Durham, England, a British company, and The Nuclear Power Group Limited, Knutsford, Cheshire, England
Filed Aug. 25, 1967, Ser. No. 663,442
Int. Cl. F28f *13/00*
U.S. Cl. 165—135                6 Claims

ABSTRACT OF THE DISCLOSURE

This invention relates to thermal insulation which may be used for the insulation of nuclear reactor pressure vessels. The invention is particularly concerned with the formation of a seal between adjacent sheets in a pack of insulation comprising metal sheets separated by spacing members, the seal being formed between adjacent sheets in a pack wherein marginal areas of the sheets are located in pairs in associated recesses formed in a sealing member.

---

This invention relates to thermal insulation, for example, the insulation of nuclear reactor pressure vessels, in which a fluid is used as the heat transfer medium.

Packs of insulation comprising metal sheets separated by spacing members have been proposed and, where these packs are used for nuclear reactor pressure vessels insulation the sheets and spacing members are preferably made from stainless steel. Packs of spaced metal sheets will be referred to herein simply as "packs." The insulation fluid is contained in the spaces formed between adjacent sheets in a pack and the insulation capacity of the fluid is dependent, among other factors, on the degree of movement of the fluid in the spaces caused by convection. It is an object of this invention to provide a seal between adjacent sheets in a pack thereby reducing the convection effect.

According to this invention, there is provided a seal between adjacent sheets in a pack wherein marginal areas of the sheets are located in pairs in associated recesses formed in a sealing member. Preferably, the sealing member is of bellows-like construction, the valleys of the bellows constituting the recesses. To facilitate location of the pairs of marginal areas of the sheets in the associated recesses the marginal areas are located in the valley of an inverted V strip.

The invention also includes a pack of sheets to form the insulation of a structure such as a nuclear reactor, wherein the marginal areas of the sheets are located in pairs in associated recesses formed in a sealing member which is preferably of bellows-like construction with the valleys of the bellows constituting the recesses.

Embodiments of the invention as applied to a nuclear reactor pressure vessel are shown by way of example in the accompanying drawings, of which:

FIG. 2 is similar to FIG. 1 and shows a second embodiment of the invention.

Figure 1:
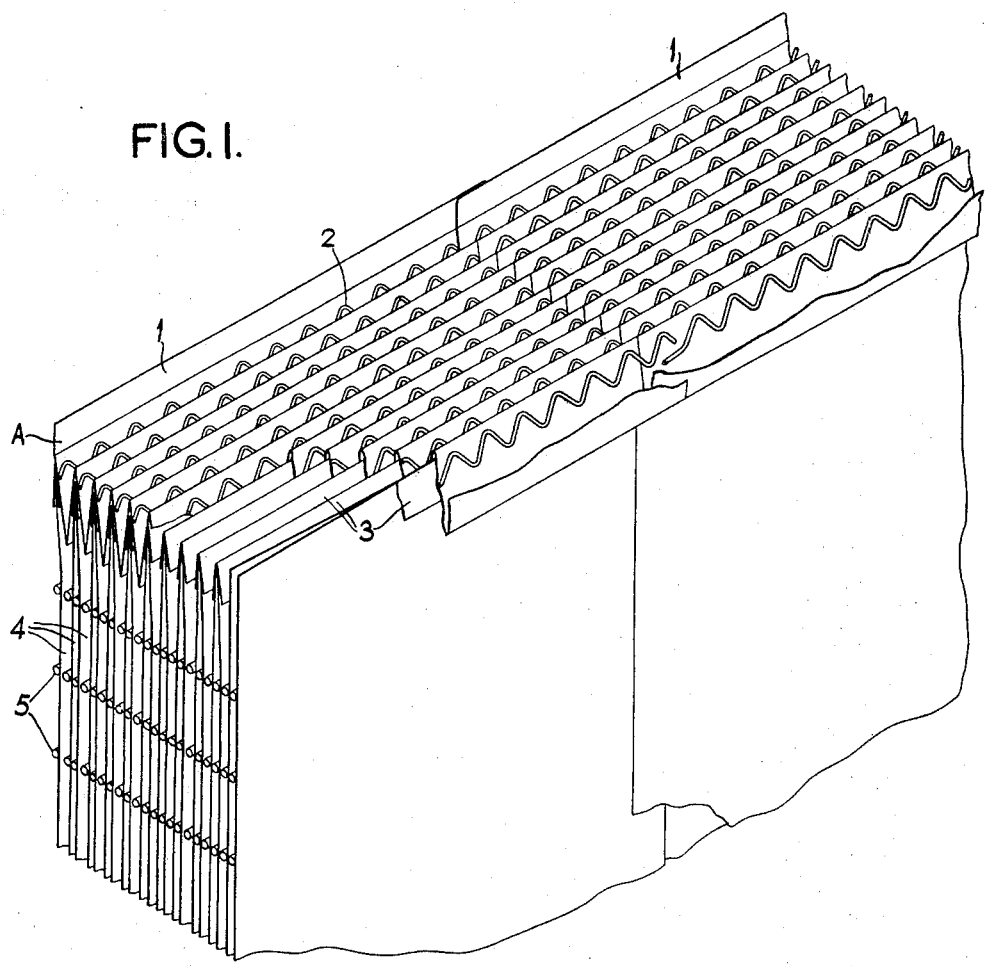
FIG. 1 is a perspective view partially broken away of one embodiment of the invention.

The sealing member consists essentially of a sheet 1 of metal, for example, stainless steel formed to assume the shape of a bellows. Where circumstances require an unusually long seal, a number of individual sealing members are employed and their ends overlapped.

In use, the sealing member 1 is inserted into the spaces between adjacent sheets 4 of a pack so that pairs of sheets are positioned in each "valley" of the sealing member. To facilitate insertion of the seal V strips 3 are placed over each pair of sheets 4. Where more than one V strip is required, the V strips are overlapped, and these overlaps are staggered in alternate layers to minimise local build-up in thickness.

Another sealing member 1 is inserted and arranged to overlap the first by an appropriate amount and preferably the overlaps of the sealing members 1 are staggered in relation to the overlaps of the V strips.

When the required number of sealing members 1 have been correctly positioned, they are welded to the vessel by means of flange A.

A pressure strip 2 is disposed as shown in FIG. 1 between adjacent folds in the bellows-like sealing member 1. In the embodiment shown in FIG. 1, the pressure strip 2 is shown as a wire of wave form and having a diameter which is approximately twice the diameter of a spacing member 5. Such an arrangement ensures that the seal is at least as thick as the insulation and consequently a coverplate (not illustrated) will compress the seal so as to hold fold on sheet 4, V strip 3 and seal 1 in close contact, thus forming an adequately gas tight seal.

The pressure strips 2 are either welded or clipped to the sealing member 1 allowing the seals to be used in any position. Due to the fact that the pressure strips 2 are attached to the sealing members 1 prior to erection in the vessel, it is necessary to arrange the overlaps or half-laps in the pressure strips 2 to correspond with the overlaps in the sealing members 1.

In some circumstances it may be preferable to attach the seals to the vessel before the insulation is in place, in this case the insulation is inserted into the seals. In these circumstances, it is not necessary to use V strips 3.

In the FIG. 2 embodiment, each corresponding edge of each sheet in a pack, for example, each topmost edge, has an associated X sectioned intermediate sealing member located to straddle the edge. In addition inverted V or U sectioned sealing members are located to straddle and thereby seal adjacent legs of adjacent X sectioned members, the said adjacent legs being disposed remotely from the edges of the sheets.

In FIG. 2, an X sectioned intermediate sealing member 10 is placed over an edge of a sheet 4 and further sealing members 10 can be arranged to overlap an adjacent sealing member to give a seal of any desired length.

A V sectioned sealing member 3 is located to straddle adjacent pairs of X sectioned members 10 as shown. The sealing members 3 are also arranged to overlap as mentioned above but, in this instance, the overlaps are staggered relative to the overlaps of sealing members 1. A pressure strip, which in the case illustrated, consists of crimped foil 12, is attached to two legs of the sealing members 1 by spot welding.

What we claim is:

1. A thermal insulation structure, comprising: a plurality of spaced insulating sheets arranged in a pack with each adjacent pair of sheets having adjacent edges; a sealing member having recesses opening toward said edges, each of said pairs of adjacent edges being located in a said recess; a V-shaped locating strip in each said recess in which are positioned the adjacent edges of each said pair of sheets; and spacing members holding said sheets apart in areas inwardly of said edges.

2. The structure of claim 1 wherein there is provided a pressure strip in said sealing member between adjacent recesses.

3. A thermal insulation structure, comprising: a plurality of spaced insulating sheets arranged in a pack with each adjacent pair of sheets having adjacent edges; a sealing member having recesses opening toward said edges, each of said pairs of adjacent edges being located in a said recess; spacing members holding said sheets apart in areas inwardly of said edges; and a pressure strip in said sealing member between adjacent recesses.

4. A thermal insulation structure, comprising: a plurality of spaced insulating sheets arranged in a pack with each adjacent pair of sheets having adjacent edges; a sealing member having recesses opening toward said edges, each of said pairs of adjacent edges being located in a said recess; spacing members holding said sheets apart in areas inwardly of said edges, each said edge of each sheet in said pack having an associated X sectioned intermediate sealing member located to straddle the edge; and inverted V-shaped sealing members located to straddle and thereby to seal adjacent legs of adjacent X sectioned members, the said adjacent legs being disposed remote from the edges of the sheets.

5. A thermal insulation structure, comprising: a plurality of spaced insulating sheets arranged in a pack with each adjacent pair of sheets having adjacent edges; a sealing member having recesses opening toward said edges, said sealing member being of bellows-like construction in which the valleys of the bellows comprise said recesses and each of said pairs of adjacent edges being located in a said recess; spacing members holding said sheets apart in areas inwardly of said edges; and a V-shaped locating strip in which the adjacent edges of each said pair of sheets are positioned within its said recess.

6. A thermal insulation structure, comprising: a plurality of spaced insulating sheets arranged in a pack with each adjacent pair of sheets having adjacent edges; a sealing member having recesses opening toward said edges, said sealing member being of bellows-like construction in which the valleys of the bellows comprise said recesses and each of said pairs of adjacent edges being located in a said recess; spacing members holding said sheets apart in areas inwardly of said edges; and a pressure strip in said sealing member between adjacent recesses.

References Cited

UNITED STATES PATENTS 3,403,807   10/1968   Hawgood et al.

REUBEN EPSTEIN, Primary Examiner

U.S. Cl. X.R.

176—87